(12) United States Patent
Al Asmari et al.

(10) Patent No.: US 11,526,844 B2
(45) Date of Patent: Dec. 13, 2022

(54) SYSTEM AND METHOD FOR OPTIMIZING INVENTORY MANAGEMENT

(71) Applicant: Saudi Arabian Oil Company, Dhahran (SA)

(72) Inventors: Hasan A. Al Asmari, Dammam (SA); Mohammed G. Al Shalan, Dammam (SA); Fouad Abdulkader, Dammam (SA); Hussain M. Al Qahtani, Dammam (SA); Nallakaluvan Murugan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 117 days.

(21) Appl. No.: 17/003,711

(22) Filed: Aug. 26, 2020

(65) Prior Publication Data

US 2022/0067637 A1 Mar. 3, 2022

(51) Int. Cl.
| | | |
|---|---|---|
| *G06Q 10/08* | (2012.01) | |
| *G06F 16/28* | (2019.01) | |
| *G06F 17/18* | (2006.01) | |
| *G06Q 10/06* | (2012.01) | |

(52) U.S. Cl.
CPC ......... *G06Q 10/087* (2013.01); *G06F 16/284* (2019.01); *G06F 17/18* (2013.01); *G06Q 10/0637* (2013.01); *G06Q 10/0833* (2013.01)

(58) Field of Classification Search
CPC ............. G06Q 10/087; G06Q 10/0637; G06Q 10/0833; G06Q 10/0631; G06F 16/284; G06F 17/18
USPC ......................................................... 705/28
See application file for complete search history.

(56) References Cited

U.S. PATENT DOCUMENTS

| | | |
|---|---|---|
| 4,737,910 A | 4/1988 | Kimbrow |
| 5,287,267 A | 2/1994 | Jayaraman et al. |
| 6,970,841 B1 | 11/2005 | Cheng et al. |
| 7,721,959 B2 | 5/2010 | Najmi |

(Continued)

FOREIGN PATENT DOCUMENTS

| | | |
|---|---|---|
| EP | 0733986 | 9/2001 |
| JP | 2010160680 | 7/2010 |

OTHER PUBLICATIONS

PCT International Search Report and Written Opinion in International Appln. No. PCT/US2021/047606, dated Dec. 10, 2021, 12 pages.

*Primary Examiner* — Garcia Ade
(74) *Attorney, Agent, or Firm* — Fish & Richardson P.C.

(57) ABSTRACT

The present disclosure describes a computer-implemented method that includes: accessing data encoding historical records involving a plurality of materials within an enterprise network, the historical records indicating a consumption pattern of each material as well as a delivery pattern of each material; based on the consumption pattern, identifying one or more hubs to stock the plurality of materials for multiple customer plants in one or more regions of an enterprise network; based on the consumption pattern of each material, determining a quantity level for stocking the material at the one or more hubs to respond to a demand for the material from the one or more of the customer plants in the one or more regions; and based on the delivery pattern of each material, monitoring an estimated lead time to respond to the demand for the material being stocked at the one or more hubs and at the quantity level.

14 Claims, 20 Drawing Sheets

(56) References Cited

U.S. PATENT DOCUMENTS

| | | | |
|---|---|---|---|
| 7,853,462 B2* | 12/2010 | Dogan | ................ G06Q 10/087 |
| | | | 705/7.31 |
| 2002/0188529 A1 | 12/2002 | Krever | |
| 2003/0212602 A1 | 11/2003 | Schaller | |
| 2018/0121866 A1 | 5/2018 | Higham et al. | |
| 2019/0347606 A1 | 11/2019 | Malecha et al. | |
| 2020/0210947 A1* | 7/2020 | Devarakonda | ... G06Q 10/08355 |
| 2021/0383316 A1* | 12/2021 | Mimassi | .............. G06Q 10/087 |

* cited by examiner

| Material num... | Shel... | Qu Inser D... | Curren... | Propos... | M001 % | M002 % | M003 % | M005 % | M006 % | M007 % | M008 % | M009 % | Hold |
|---|---|---|---|---|---|---|---|---|---|---|---|---|---|
| 1000000706 | | 05/26/2015 | S2 | MI | 12.31 | 8.31 | 37.33 | 0.00 | 12.72 | 0.00 | 0.00 | 29.33 | ⊙ |
| 1000000707 | | 05/26/2015 | M6 | MI | 5.09 | 55.00 | 7.05 | 32.85 | 0.00 | 0.00 | 0.00 | 0.00 | ⊙ |
| 1000000708 | | 05/26/2015 | MY | MI | 6.48 | 20.77 | 2.36 | 21.48 | 5.25 | 5.64 | 7.92 | 30.01 | ⊙ |
| 1000000710 | | 05/26/2015 | S2 | MI | 0.00 | 16.45 | 0.00 | 15.10 | 0.00 | 21.76 | 0.00 | 46.71 | ⊙ |
| 1000000730 | | 05/26/2015 | M6 | MI | 28.56 | 15.63 | 7.34 | 7.45 | 10.04 | 4.85 | 15.13 | 10.90 | ⊙ |
| 1000000732 | | 05/26/2015 | MY | MI | 15.82 | 21.63 | 1.04 | 20.18 | 2.75 | 13.21 | 3.65 | 21.71 | ⊙ |
| 1000000734 | | 05/26/2015 | M2 | MI | 17.87 | 1.13 | 0.00 | 20.16 | 2.12 | 43.18 | 10.84 | 4.80 | ⊙ |
| 1000000739 | | 05/26/2015 | S9 | MI | 0.00 | 19.73 | 0.00 | 25.09 | 0.00 | 47.58 | 0.00 | 7.01 | ⊙ |
| 1000000741 | | 05/26/2015 | MY | MI | 7.51 | 29.42 | 0.84 | 26.88 | 1.84 | 27.12 | 2.96 | 3.44 | ⊙ |
| 1000000743 | | 05/26/2015 | MY | MI | 11.85 | 58.52 | 0.56 | 4.33 | 0.57 | 12.53 | 4.10 | 7.25 | ⊙ |
| 1000000745 | | 05/26/2015 | S2 | MI | 2.11 | 88.07 | 0.00 | 3.51 | 1.53 | 4.77 | 0.00 | 0.00 | ⊙ |
| 1000000747 | | 05/26/2015 | S8 | S5 | 0.00 | 0.00 | 0.00 | 100.00 | 0.00 | 0.00 | 0.00 | 0.00 | ⊙ |
| 1000000749 | | 05/26/2015 | MY | MI | 21.09 | 25.38 | 0.00 | 17.60 | 6.43 | 9.12 | 9.13 | 11.26 | ⊙ |
| 1000000751 | | 05/26/2015 | MZ | MI | 33.47 | 29.68 | 1.30 | 13.37 | 0.60 | 10.53 | 1.45 | 9.60 | ⊙ |
| 1000000753 | | 05/26/2015 | S9 | MI | 4.68 | 16.66 | 2.04 | 18.93 | 1.56 | 31.63 | 0.00 | 24.50 | ⊙ |
| 1000000763 | | 05/26/2015 | S5 | MI | 0.00 | 0.00 | 0.00 | 85.33 | 0.00 | 0.00 | 0.00 | 14.67 | ⊙ |
| 1000000775 | | 05/26/2015 | MY | MI | 26.67 | 5.16 | 3.11 | 17.56 | 11.66 | 12.92 | 11.00 | 11.94 | ⊙ |
| 1000000778 | | 05/26/2015 | M5 | MI | 27.78 | 41.55 | 0.00 | 14.22 | 0.66 | 5.02 | 0.00 | 10.76 | ⊙ |
| 1000000781 | | 05/26/2015 | MP | MI | 23.87 | 5.12 | 1.49 | 13.52 | 14.05 | 19.13 | 18.54 | 4.27 | ⊙ |
| 1000000785 | | 05/26/2015 | M5 | MI | 46.73 | 0.00 | 0.00 | 5.62 | 1.82 | 37.97 | 0.00 | 7.87 | ⊙ |
| 1000000787 | | 05/26/2015 | M6 | MI | 13.48 | 51.29 | 0.00 | 1.77 | 0.68 | 26.93 | 0.29 | 5.56 | ⊙ |
| 1000000789 | | 05/26/2015 | MP | MI | 35.49 | 2.75 | 0.00 | 12.47 | 5.84 | 29.06 | 4.53 | 9.85 | ⊙ |

FIG. 4A

Material Service Center Monthly Consumption Details

| MMC | MMC | Period | Σ Issued Quantity | Σ Reversal Quantity | Σ Consumption Quantity | Unit | MSC | Tot... |
|---|---|---|---|---|---|---|---|---|
| S2 | MI | 2013-06 | 80.000 | 0.000 | 80.000 | FT | M001 | 1 |
| S2 | | | 80.000 | 0.000 | 80.000 | | M001 | 4 |
| S2 | MI | 2010-05 | 30.000 | 0.000 | 30.000 | FT | M002 | 4 |
| S2 | MI | 2014-03 | 27.000 | 0.000 | 27.000 | FT | | 4 |
| S2 | MI | 2014-09 | 27.000 | 0.000 | 27.000 | FT | | 4 |
| S2 | MI | 2015-05 | 27.000 | 0.000 | 27.000 | FT | | 4 |
| S2 | | | 111.000 | 0.000 | 111.000 | | M002 | 10 |
| S2 | MI | 2008-03 | 20.000 | 0.000 | 20.000 | FT | M003 | 10 |
| S2 | MI | 2010-01 | 48.000 | 0.000 | 48.000 | FT | | 10 |
| S2 | MI | 2010-03 | 12.000 | 0.000 | 12.000 | FT | | 10 |
| S2 | MI | 2010-04 | 160.000 | 0.000 | 160.000 | FT | | 10 |
| S2 | MI | 2011-05 | 200.000 | 0.000 | 200.000 | FT | | 10 |
| S2 | MI | 2013-04 | 264.000 | 0.000 | 264.000 | FT | | 10 |
| S2 | MI | 2014-09 | 100.000 | 0.000 | 100.000 | FT | | 10 |
| S2 | | | 804.000 | 0.000 | 804.000 | | M003 | 7 |
| S2 | MI | 2005-08 | 44.000 | 0.000 | 44.000 | FT | M006 | 7 |
| S2 | MI | 2006-12 | 20.000 | 0.000 | 20.000 | FT | | 7 |
| S2 | MI | 2009-03 | 40.000 | 0.000 | 40.000 | FT | | 7 |
| S2 | MI | 2011-10 | 18.000 | 0.000 | 18.000 | FT | | 7 |
| S2 | MI | 2012-09 | 80.000 | 0.000 | 80.000 | FT | | 7 |
| S2 | MI | 2013-03 | 44.000 | 0.000 | 44.000 | FT | | 7 |
| S2 | | | 246.000 | 0.000 | 246.000 | | M006 | 9 |
| S2 | MI | 2004-02 | 20.000 | 0.000 | 20.000 | FT | M009 | 9 |
| S2 | MI | 2015-03 | 66.000 | 0.000 | 66.000 | FT | | 9 |
| S2 | MI | 2015-05 | 220.000 | 0.000 | 220.000 | FT | | 9 |
| S2 | | | 306.000 | 0.000 | 306.000 | | M009 | |
| | | | 1,547.000 | | 1,547.000 | | | |

FIG. 4B

StockSMART© - Lead Time Simulation & Update

Number of Materials Displayed : 3
This is Test Run. Lead Time Update will not happen.

| MATERIAL | PLANT | OLD LEAD TIME | NEW LEAD TIME |
|---|---|---|---|
| 1000000255 | M002 | 7 | 7 |
| 1000000255 | Z009 | 7 | 7 |
| 1000000255 | Z015 | 7 | 7 |
| 1000000255 | B001 | 7 | 3 |
| 1000000255 | Y001 | 7 | 3 |
| 1000000255 | Y003 | 7 | 3 |
| 1000000434 | M002 | 3 | 7 |
| 1000000434 | Z009 | 3 | 7 |
| 1000000434 | A001 | 3 | 3 |
| 1000000434 | B001 | 3 | 3 |
| 1000000434 | D001 | 3 | 3 |
| 1000000434 | E003 | 3 | 3 |
| 1000000434 | J010 | 3 | 3 |
| 1000000434 | Y001 | 3 | 3 |
| 1000000434 | Y002 | 3 | 3 |
| 1000000434 | Y003 | 3 | 3 |
| 1000000434 | Z001 | 3 | 3 |
| 1000000434 | Z005 | 3 | 3 |
| 1000000705 | M001 | 132 | 7 |
| 1000000705 | M002 | 34 | 7 |
| 1000000705 | Z009 | 66 | 7 |
| 1000000705 | Z011 | 10 | 7 |
| 1000000705 | A001 | 3 | 3 |
| 1000000705 | A013 | 0 | 3 |
| 1000000705 | Y001 | 0 | 3 |
| 1000000705 | Y002 | 0 | 3 |
| 1000000705 | Y003 | 0 | 3 |
| 1000000705 | Z018 | 3 | 3 |

StockSMART© - Lead Time Simulation & Update

| MATERIAL | MATERIAL DOC | GR DATE | PO NUMBER | PO CREAT DATE | PO DOC DATE | AGR LT |
|---|---|---|---|---|---|---|
| 100000000184 | 500070643 | 10/26/2017 | 4500035357 | 10/26/2017 | 10/26/2017 | 0 |
| 100000000184 | 500069399 | 11/23/2016 | 4500034484 | 11/23/2016 | 11/23/2016 | 0 |
| 100000000184 | 500068798 | 12/10/2015 | 4500033693 | 12/09/2015 | 12/09/2015 | 0 |

| MAX AGR LT | AGR DOC | AGR TYPE | PR NUMBER | PR REL DT | MIN NONAGR LT | CALC LT | CALC AVG LT |
|---|---|---|---|---|---|---|---|
| 0 | | | 5000064842 | 10/26/2017 | 7 | 1 | 1 |
| 0 | | | 1000032834 | 11/23/2016 | 7 | 1 | 1 |
| 0 | | | 1000032073 | 12/09/2015 | 7 | 2 | 1 |

[ Proceed with Decision ] [ Accept All ] [ Reject All ] [ 3D Graph Analysis ] [ SA-3938 ]

| Material | Plant | Old MRP Type | New MRP Type | First 12M Hits | Last 12M Hits | 24M Hits | 36M Hits |
|---|---|---|---|---|---|---|---|
| 000000001000000617 | M008 | ZF | ZM | 3 | 2 | 5 | 6 |
| 000000001000000619 | M001 | NO | ZR | | | | |
| 000000001000000624 | M009 | ZM | ZR | 1 | 3 | 4 | 4 |
| 000000001000000668 | M002 | ZF | ZM | 4 | 1 | 5 | 6 |
| 000000001000000674 | | ZM | ZR | 1 | 3 | 4 | 4 |
| 000000001000000695 | | ZF | ZM | 2 | 2 | 3 | 7 |
| 000000001000000705 | | ZF | ZM | 2 | 3 | 5 | 8 |
| 000000001000000986 | M005 | ZF | ZM | 2 | 2 | 4 | 4 |
| 000000001000001123 | M002 | ZF | ZM | 4 | 5 | 7 | 10 |
| 000000001000001129 | | ZF | ZM | | 1 | 3 | 8 |
| 000000001000001136 | M009 | ZM | ZM | 2 | 3 | 4 | 4 |
| 000000001000001141 | M003 | ZF | ZR | 3 | 2 | 5 | 10 |
| 000000001000001... | M009 | ZF | ZM | | 2 | 2 | 7 |
| 000000001000001166 | M001 | ZF | ZM | 2 | 5 | 7 | 6 |
| 000000001000001... | M003 | ZM | ZR | | 3 | 4 | 11 |
| 000000001000001167 | M009 | ZM | ZM | 1 | 2 | 3 | 6 |
| 000000001000001205 | M002 | ZM | ZR | | | | |

| Material | Plant | Mat Group | Div/MMC | MRP Cont | MRP Prof | MRP Prof | Reorder | Serv lev | Serv lev | Max le | Max le |
|---|---|---|---|---|---|---|---|---|---|---|---|
| 100001136 | M009 | 0151000 | RV | Z06 | MSCG | 58.000 | 0.000 | 85.0 | 0.0 | 91.000 | 0.000 |

Table to build rules for determining Service level

| Typ | $ Mon... | $ Monthly Usua...... | Hits Low | Hits High | Serv Level | Serv Factr |
|---|---|---|---|---|---|---|
| ZF | 0.00 | 500.00 | 0 | 12 | 95 | |
| ZF | 0.00 | 500.00 | 13 | 18 | 98 | |
| ZF | 0.00 | 500.00 | 19 | 24 | 99 | |
| ZF | 501.00 | 1,000.00 | 0 | 12 | 94 | |
| ZF | 501.00 | 1,000.00 | 13 | 18 | 97 | |
| ZF | 501.00 | 1,000.00 | 19 | 24 | 98 | |
| ZF | 1,001 ... | 1,500.00 | 0 | 12 | 92 | |
| ZF | 1,001 ... | 1,500.00 | 13 | 18 | 95 | |
| ZF | 1,001 ... | 1,500.00 | 19 | 24 | 97 | |
| ZF | 1,501 ... | 2,500.00 | 0 | 12 | 90 | |
| ZF | 1,501 ... | 2,500.00 | 13 | 18 | 92 | |
| ZF | 1,501 ... | 2,500.00 | 19 | 24 | 96 | |
| ZF | 2,501 ... | 4,000.00 | 0 | 12 | 90 | |
| ZF | 2,501 ... | 4,000.00 | 13 | 18 | 92 | |
| ZF | 4,001 ... | 25,000.00 | 0 | 12 | 95 | |
| ZF | 4,001 ... | 25,000.00 | 13 | 18 | 85 | |
| ZF | 4,001 ... | 25,000.00 | 19 | 24 | 90 | |
| ZF | 25,001 ... | 999,999.00 | 0 | 12 | 92 | |
| ZF | 25,001 ... | 999,999.00 | 13 | 18 | 85 | |
| ZF | 25,001 ... | 999,999.00 | 19 | 24 | 90 | |
| ZM | 0.00 | 500.00 | 0 | 12 | 90 | 1.3 |
| ZM | 0.00 | 500.00 | 13 | 18 | 90 | 1.3 |
| ZM | 501.00 | 1,000.00 | 19 | 24 | 90 | 1.3 |
| ZM | 501.00 | 1,000.00 | 13 | 18 | 90 | 1.3 |

FIG. 8D

SYSTEM AND METHOD FOR OPTIMIZING INVENTORY MANAGEMENT

TECHNICAL FIELD

This disclosure generally relates to real-time inventory management in an enterprise resource planning (ERP) network.

BACKGROUND

Enterprise resource planning (ERP) aims at integrated management of main business processes, often in real time and mediated by software and technology. ERP provides an integrated and continuously updated view of core business processes using, for example, relational databases maintained by a database management system.

SUMMARY

In one aspect, the present disclosure describes a computer-implemented method including: accessing data encoding historical records involving a plurality of materials within an enterprise network, the historical records indicating a consumption pattern of each material as well as a delivery pattern of each material; based on the consumption pattern, identifying one or more hubs to stock the plurality of materials for multiple customer plants in one or more regions of the enterprise network; based on the consumption pattern and the delivery pattern of each material, determining a quantity level for stocking the material at the one or more hubs to respond to a demand for the material from the one or more of the customer plants in the one or more regions; and based on the delivery pattern of each material, monitoring an estimated lead time to respond to the demand for the material being stocked at the one or more hubs and at the quantity level.

Implementations may include one or more of the following features.

The method may further include: determining a safety stock point for the material being stocked at the one or more hubs. The method may further include: configuring a service level to indicate the safety stock point, wherein a higher service level compensates for an additional consumption of the material being stocked by the one or more customer plants or an extension to the estimated lead time.

The method may further include: determining a re-orderable point for the material being stocked at the one or more hubs. The method may further include: determining an upper limit for the material being stocked at the one or more hubs. The method may further include: determining an economic order quantity (EOQ) for the material being stocked that characterizes a tradeoff between ordering the material from an outside supply and carrying the material as an internal inventory.

The method may further include providing the estimated lead time by: obtaining, from the historical records involving the material being stocked, a set of procurement times for the material; identifying statistical outliers in the set of procurement times; removing the statistical outliers from the set of procurement times; and computing a statistical mean of the set of procurement times. Providing the estimated lead time may further include: comparing the statistical mean with a threshold that indicates a tolerance level for waiting for a delivery of the material; and in response to the statistical mean being no greater than the threshold, updating the estimated lead time as the statistical mean. Identifying the one or more hubs may be performed periodically to refresh the identified one or more hubs.

In another aspect, the present disclosure describes a computer system comprising one or more computer processors configured to perform operations of: accessing data encoding historical records involving a plurality of materials within an enterprise network, the historical records indicating a consumption pattern of each material as well as a delivery pattern of each material; based on the consumption pattern, identifying one or more hubs to stock the plurality of materials for multiple customer plants in one or more regions of the enterprise network; based on the consumption pattern and the delivery pattern of each material, determining a quantity level for stocking the material at the one or more hubs to respond to a demand for the material from the one or more of the customer plants in the one or more regions; and based on the delivery pattern of each material, monitoring an estimated lead time to respond to the demand for the material being stocked at the one or more hubs and at the quantity level.

Implementations may include one or more of the following features.

The operations may further include: determining a safety stock point for the material being stocked at the one or more hubs. The operations may further include: configuring a service level to indicate the safety stock point, wherein a higher service level compensates for an additional consumption of the material being stocked by the one or more customer plants or an extension to the estimated lead time.

The operations may further include: determining a re-orderable point for the material being stocked at the one or more hubs. The method may further include: determining an upper limit for the material being stocked at the one or more hubs. The operations may further include: determining an economic order quantity (EOQ) for the material being stocked that characterizes a tradeoff between ordering the material from an outside supply and carrying the material as an internal inventory.

The operations may further include providing the estimated lead time by: obtaining, from the historical records involving the material being stocked, a set of procurement times for the material; identifying statistical outliers in the set of procurement times; removing the statistical outliers from the set of procurement times; and computing a statistical mean of the set of procurement times. Providing the estimated lead time may further include: comparing the statistical mean with a threshold that indicates a tolerance level for waiting for a delivery of the material; and in response to the statistical mean being no greater than the threshold, updating the estimated lead time as the statistical mean. Identifying the one or more hubs may be performed periodically to refresh the identified one or more hubs.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIG. 6C illustrates an example of a screenshot showing the basis of calculation of lead time according to an implementation of the present disclosure.

FIG. 8A-8D illustrate examples of various updates to the database system according to some implementations of the present disclosure.

Like reference numbers and designations in the various drawings indicate like elements.

DETAILED DESCRIPTION

The disclosed technology is directed to system and method for converting inventory management experience and Material Requirement Planning (MRP) into an expert system by identifying and proposing MRP database actions such as MRP parameter update, material management codes, lead time update, and consumption fine tuning. Such functionalities take this function to a new extent where system can analyze and propose required MRP function. At an enterprise level, an enterprise resource planning (ERP) database software may monitor the supply chain of materials being used by the company to provide products and services. The ERP database software can track a network of suppliers, distribution centers, and consumer locations through which components and products flow. The ERP database software may optimize system parameters that include safety buffers of inventory used to provide an inventory of products and services. The inventory stored can be optimized to minimize costs associated working capital and storage while simultaneously satisfying customer service levels. Every enterprise may face a challenge of matching a supply volume with respect to the diverse demands from various parts of the enterprise. Typically, the management of supply chain is directly proportional to costs that any company may have and thus significantly affects the profitability of the company. Therefore, it would be advantageous to keep inventory level low while maintaining normal operations of the business.

The technology includes the following salient features. First, the ERP system can identify the right hub (also known as material service center, or MSC) to stock a material. Second, the ERP system can determine an optimal quantity of the material to be stocked based on its consumption trend. Third, the ERP system can calculate an accurate lead time for every material in order to stock the optimal quantity to strike an optimized trade-off. Fourth, the ERP software can calculate the optimal safety stock, re-orderable point and maximum stocking level to provide an optimal service level.

Figure 1:
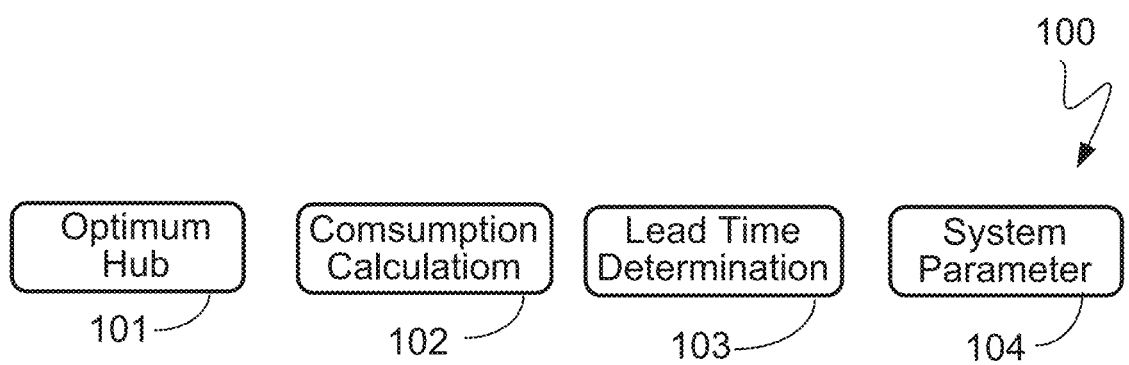
FIG. 1 illustrates an example of block components of a database system according to an implementation of the present disclosure.

Referring to FIG. 1, block components of an example of an ERP system 100 may include: a block 101 to identify the optimum hub (MSC), a block 102 to calculate the consumption of one or more materials, a block 103 to determine the lead time for procuring the one or more materials, and a block 104 to configure the parameters of the ERP system for managing stock materials (e.g., material requirement planning).

In block 101, some implementations seek to identify the right stocking hub (Material service center—MSC) for every material. For example, the historical consumption pattern for the last 36 months of every material can be tracked and analyzed. The results can drive a decision on whether the material should be stocked in single hub or in multiple hubs. Indeed, the end result: of this analysis can determine, for every material, whether the material should be assigned with a Material Management Code (MMC) that corresponds to a single service center or multiple service centers. The MMC code dictates in which Hub (MSC) a Material will be planned, stocked and distributed.

Some implementations allow for two stocking models, namely, a single hub model, or a multi-hub model. As to the single hub model, by way of illustration, when the consumption of the material from a single specific region meets a pre specified threshold, (e.g., 92%), the material will be marked for single hub planning. The threshold is dynamically configurable, thus, allowing the planners flexibility to address supply chain constraints. Some implementations use a material management code that is a two letter code denoting whether a material will maintained in single hub or in multi-hub.

Figure 2A:
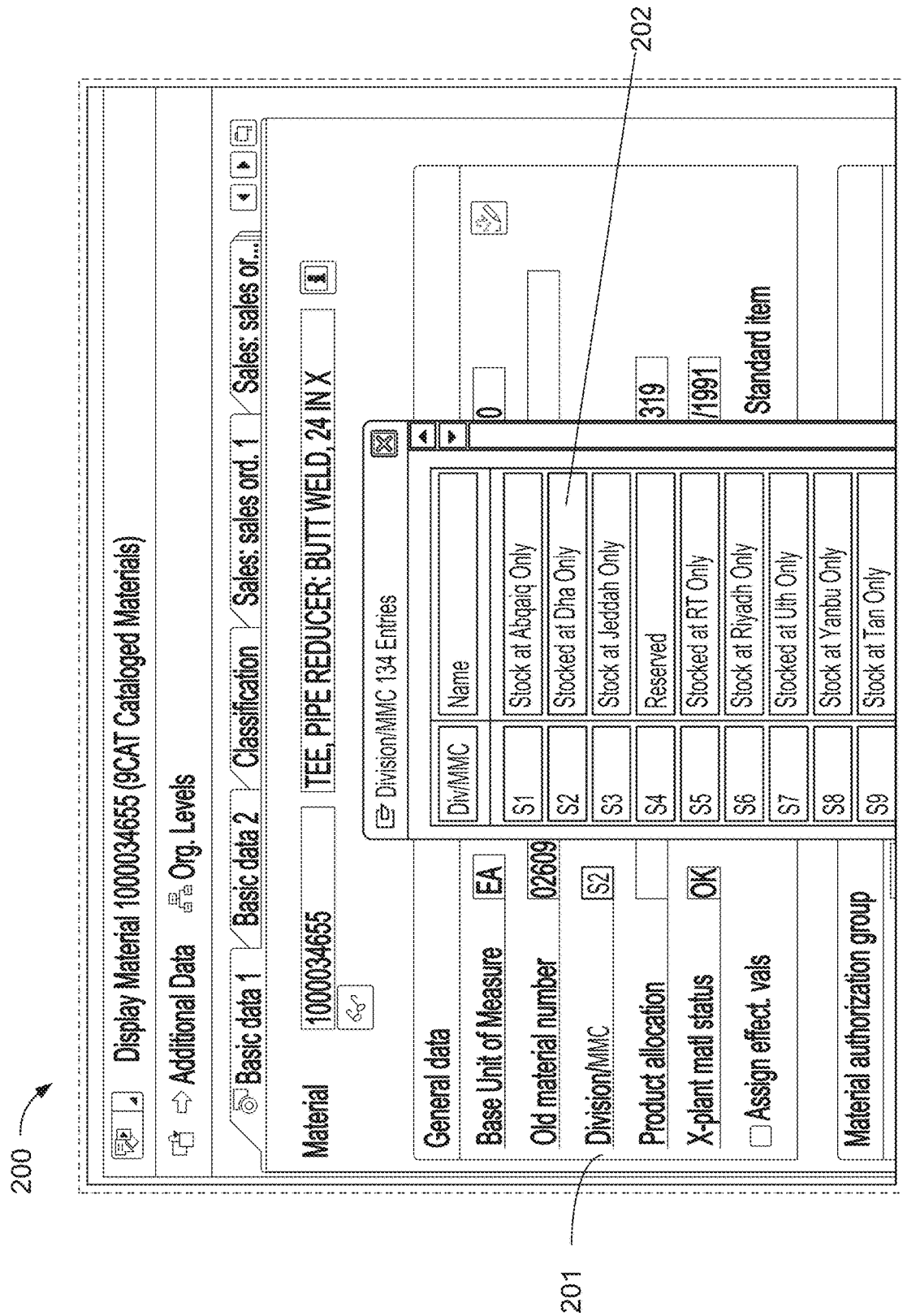
FIGS. 2A to 2B illustrate an example of a single hub configuration according to an implementation of the present disclosure.

Further referring to FIG. 2A, an example 200 for a single hub maintained material can have an MMC (material management code) code of "S2," (see block 201) which means the material would be only stocked in MSC (material stocking center) "M002" because consumption of this material occurs only in one region. All customer (plants) demands would be planned, procured, stocked and supplied by this MSC, as indicated by block 202.

Figure 2B:
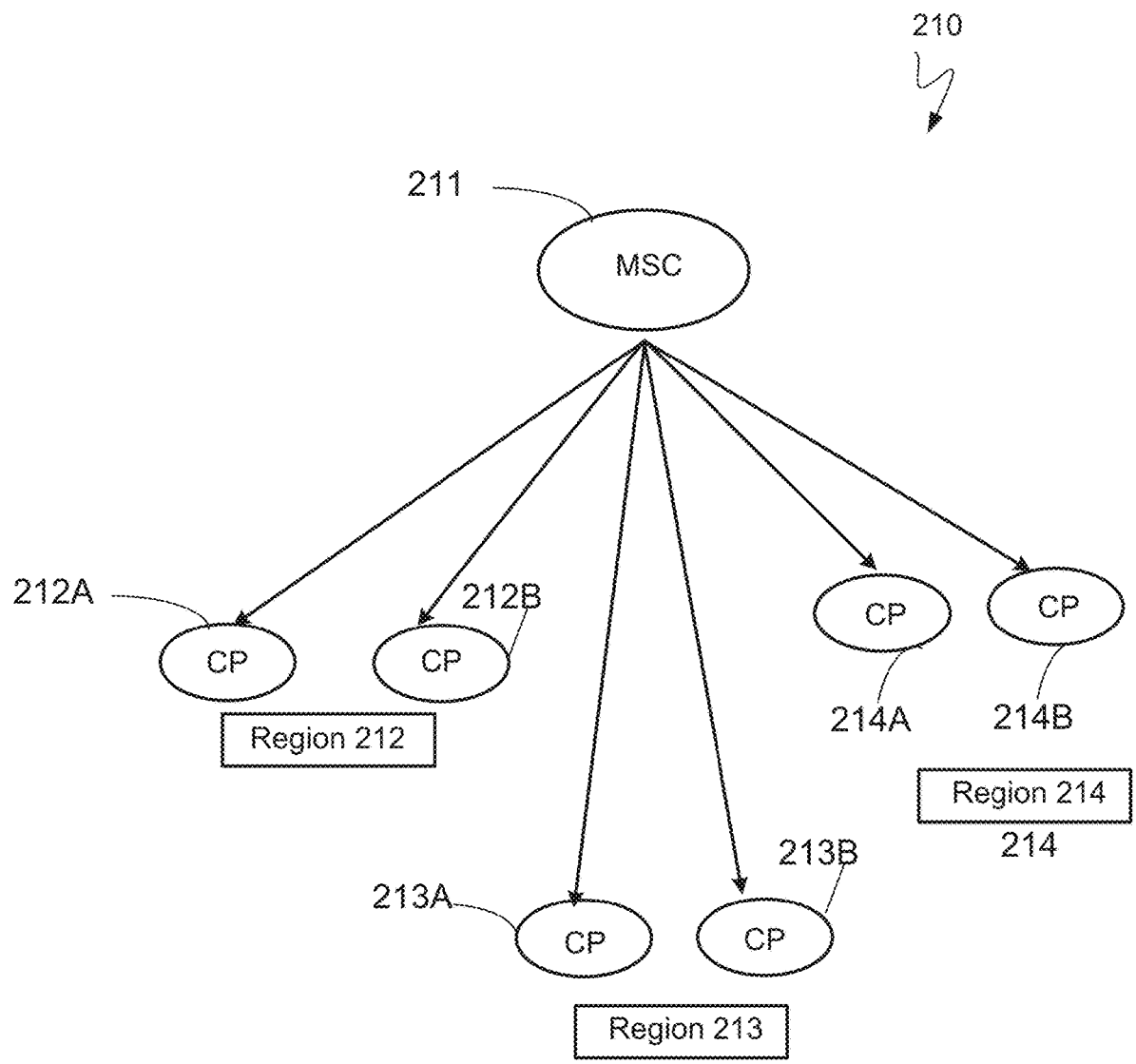

As illustrated in FIG. 2B, diagram 210 shows MSC (material service center) 211 supplies materials to customer plants CP 212A, CP 212B, CP 213A, CP 213B, CP 214A, and CP 214B. Here, CP 212A and CP 212B are located in region 212; CP 213A and CP 213B are located in region 213; and CP 214A and CP 214B are located in region 214. In other words, MSC 211 is the single hub for regions 212, 213, and 214.

As to the multi-hub model, it refers to scenarios when the consumption and demand occur across multiple regions, where no region meets the pre specified threshold. In these scenarios, multi-hub planning will be considered for stocking of the materials. In this model the hub combinations M are chosen from the power set $\{M\in \mathbb{P}_{\geq 1}(S)\}$ containing all subset combinations of material service centers S.

Figure 3A:
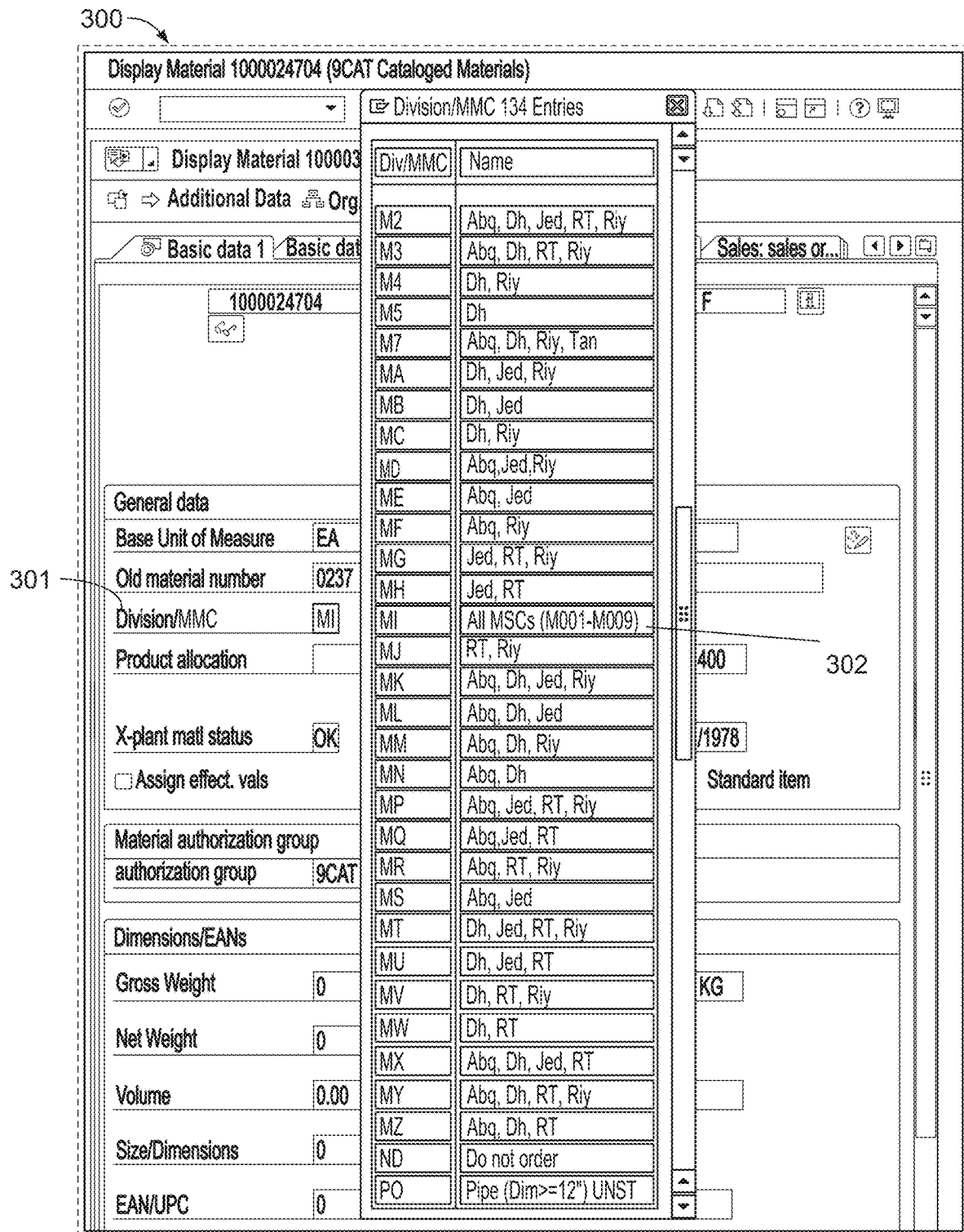
FIGS. 3A to 3B illustrate an example of a multi-hub configuration according to an implementation of the present disclosure.

Further referring to FIG. 3A, an example 300 for a multi-hub maintained material whose MMC code is "MI" (see 301) which means the material would be stocked in all MSCs as consumption of this material is scattered across all regions. In this scenario, all customer (plants) demands would be planned, procured, stocked and supplied by their nearest MSCs, as indicated in box 302.

Figure 3B:
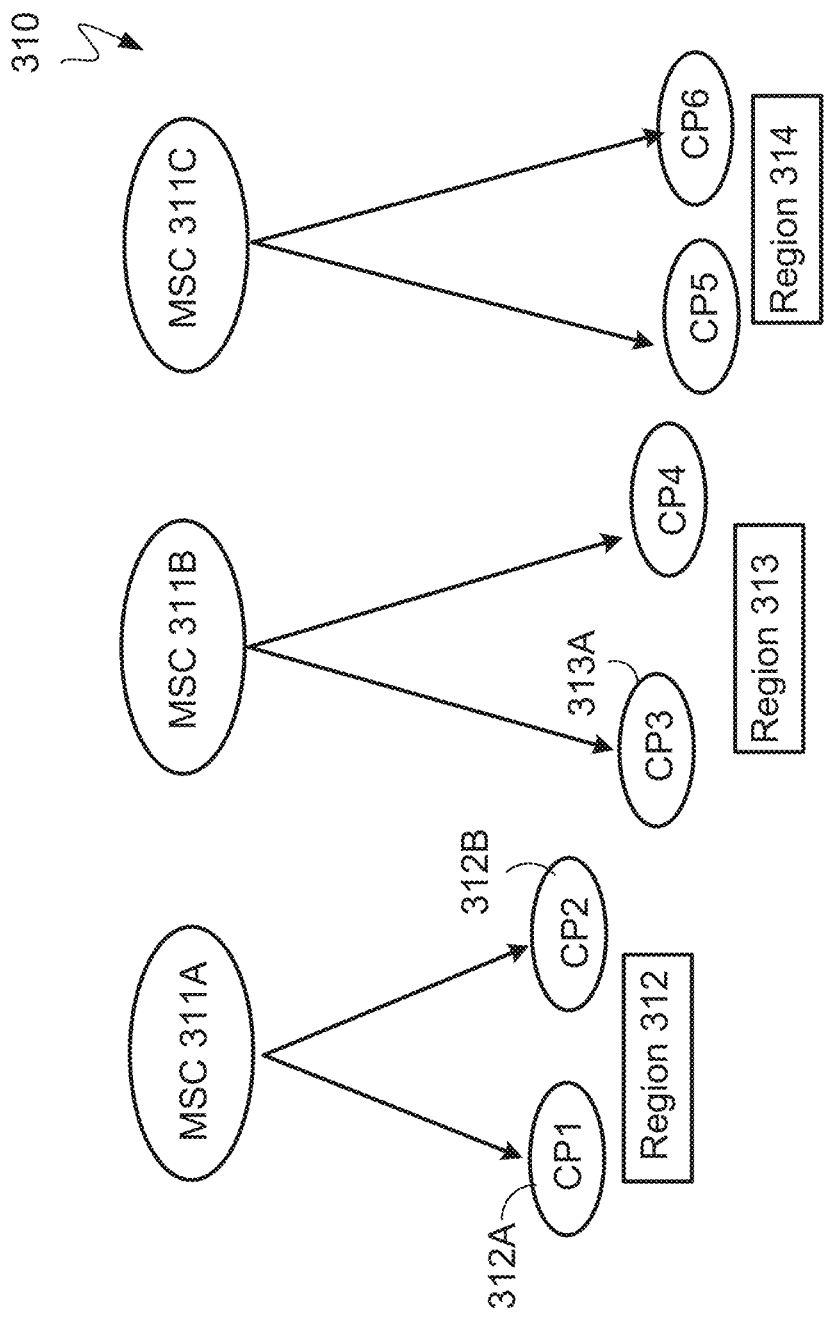

As illustrated in FIG. 3B, diagram 310 shows MSC (material service center) 311A supplies materials to customer plants CP 312A and CP 312B in region 312; MSC 311B supplies materials to customer plants CP 313A and CP 313B in region 313; and MSC 311C supplies materials to CP 314A and CP 314B in region 314. In other words, MSC centers 311A, 311B, and 311C provide the multi-hub for regions 312, 313, and 314.

In some implementations, optimal hub determination can be executed periodically based on the criteria setup for single and multiple hub. For example, after the hub or hub combination is identified, the method may report to the database controllers the preferred stocking hub for each material. In this example, after the controller has analyzed the available historical data, the database system is leveraged to propose the materials assignment changes based on the recent trends in the data. Such proposed assignment changes can include % of consumption from various regions and the system proposed ideal stocking location.

Figure 4A:
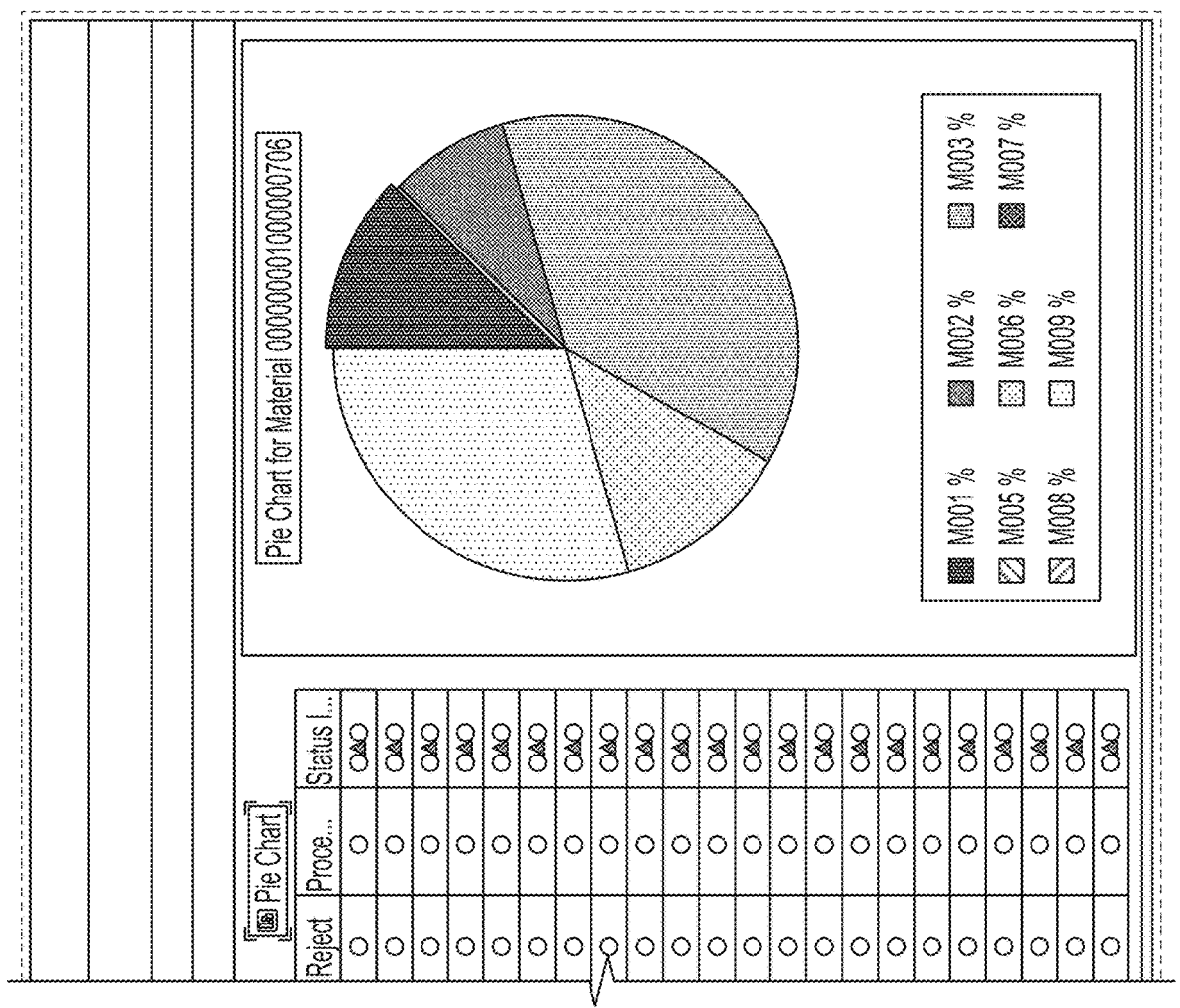
FIGS. 4A-4B illustrate examples of material assignment and consumption according to an implementation of the present disclosure.
Figure 4B:
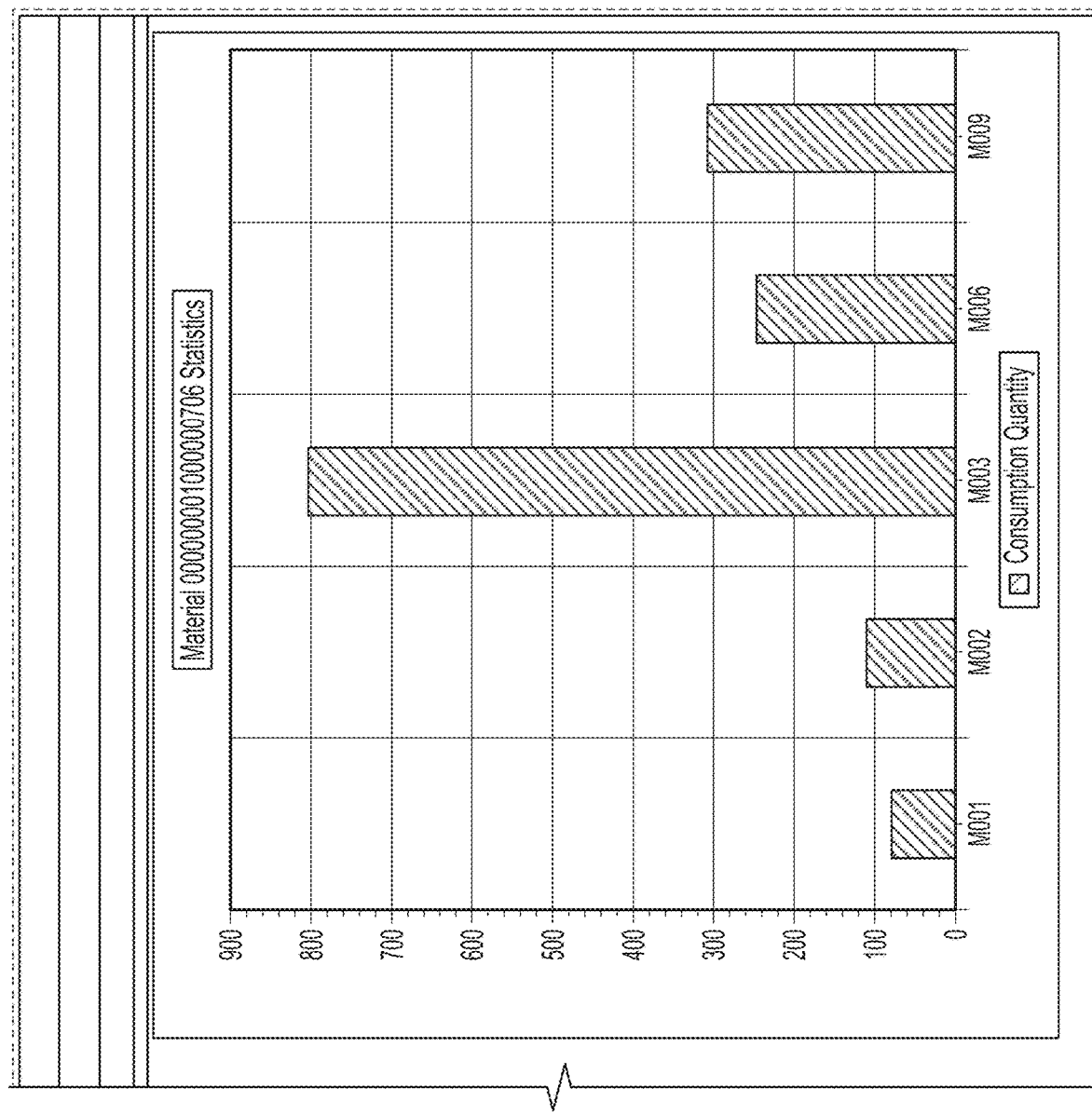

Further referring to FIGS. 4A and 4B, chart 400 represents an example of the assignment of materials assignment, and chart 420 shows an example of the quarterly consumption of the materials at each MSC center. In these examples, chart 400 includes a pie chart for the proposed assignment at the various MSC centers to stock a given material. Similarly, chart 420 includes a bar chart showing the quarterly consumption of the given material at the various MSC centers. In other words, the quarterly consumption of the given material has prompted changes in the assignment at each MSC center to stockpile the given material.

Figure 5:
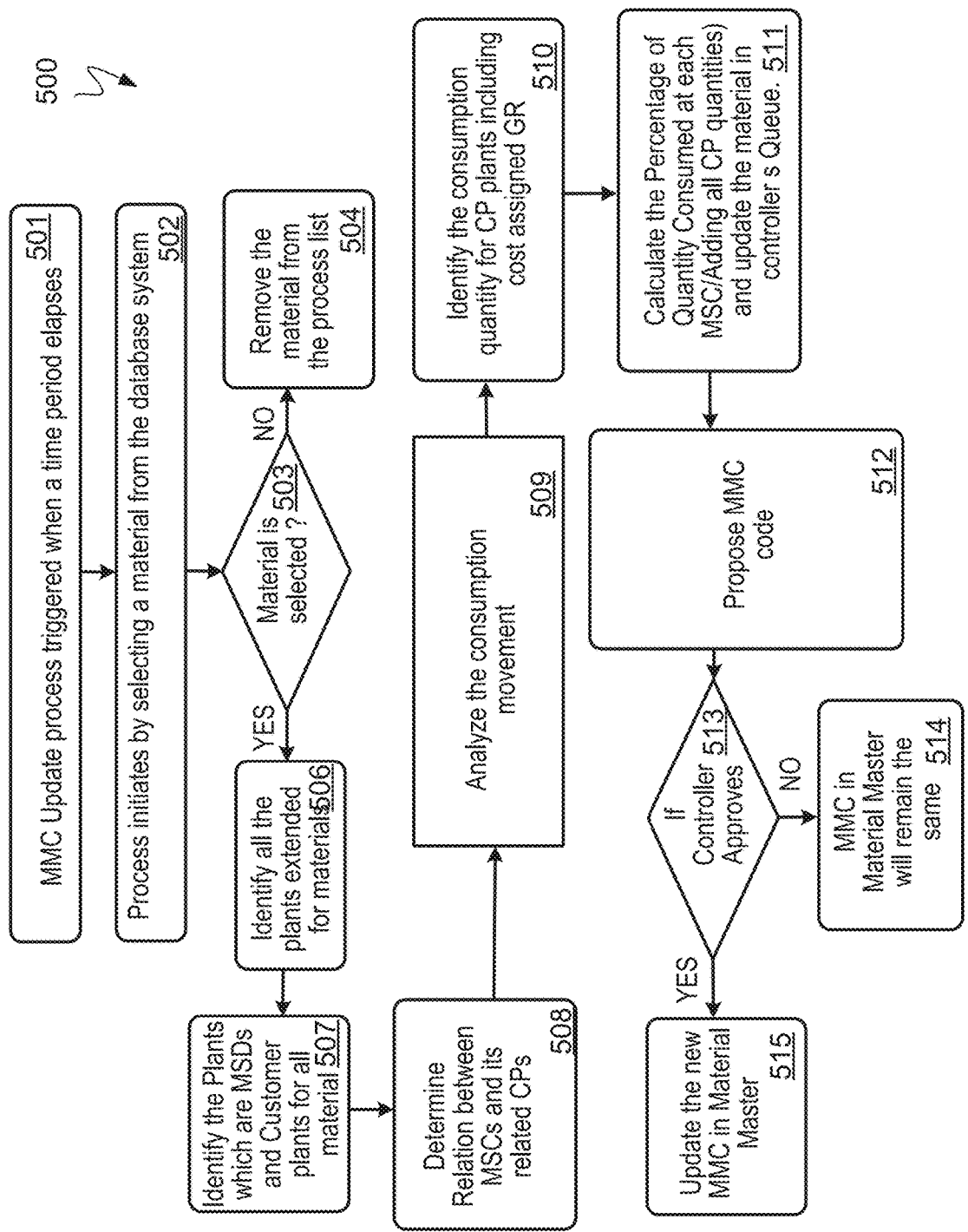
FIG. 5 illustrates an example of a flowchart for lead time monitoring and updating according to an implementation of the present disclosure.

With the MSC center(s) determined and the assignment changed determined, some implementations may proceed to determine a stocking plan for the materials. Further referring to FIG. 5, an example of a flowchart 500 for lead time monitoring and updating is provided below.

When a time period has elapsed, an MMC (material management code) update process is triggered (501). In some cases, this time period can be six months. The time period can be adjustable. The update process initiates by selecting a material from the database system (for example, the expert system for material requirement planning based on an ERP database) (502). The update process then determines whether the material is of the class of the selected material, for example, 9CAT (503). Here, 9CAT represents cataloged materials. If the material is not of this class, then the material is removed from the process list (504). If the material is of this class, then all plants are extended for materials (506).

The update process may then identify the plants which have been coded with a management code (MMC) and the customer plants for all materials (507). The update may then determine the relationship between the material storage centers (MSCs) and the customer plants (508). Examples of these relationships can be found in FIGS. 2B and 3B. The determination table can leverage a configuration table that stores the mapped relationship.

The update process may then proceed to analyze the consumption movement for the material (509). In some implementations, the consumption information of each material may be mapped from another configuration table that provides links to the historical consumption data of the material.

The update process may then proceed to identify the consumption quantity for CP plants (510). The consumption quantity identification may factor in cost assigned to each MSC center and CP plant.

The update process may then calculate the percentage of quantity consumed at each MSC center (e.g., including quantities from all CP plants supported by the MSC center) and update the available material in controller's queue (511).

In block 512, the updater process may then propose a single hub, denoted "S," if the percentage in a MSC is greater than, for example, 92%. The logic may be applied to all MSC. If the percentage in all MSC is greater than 8%, update process may then propose a multi-hub, denoted "M."

If the controller approves (513), the MMC code in material master field will remain the same (514); otherwise, the MMC code in the material master field will be updated (515).

Figure 6A:
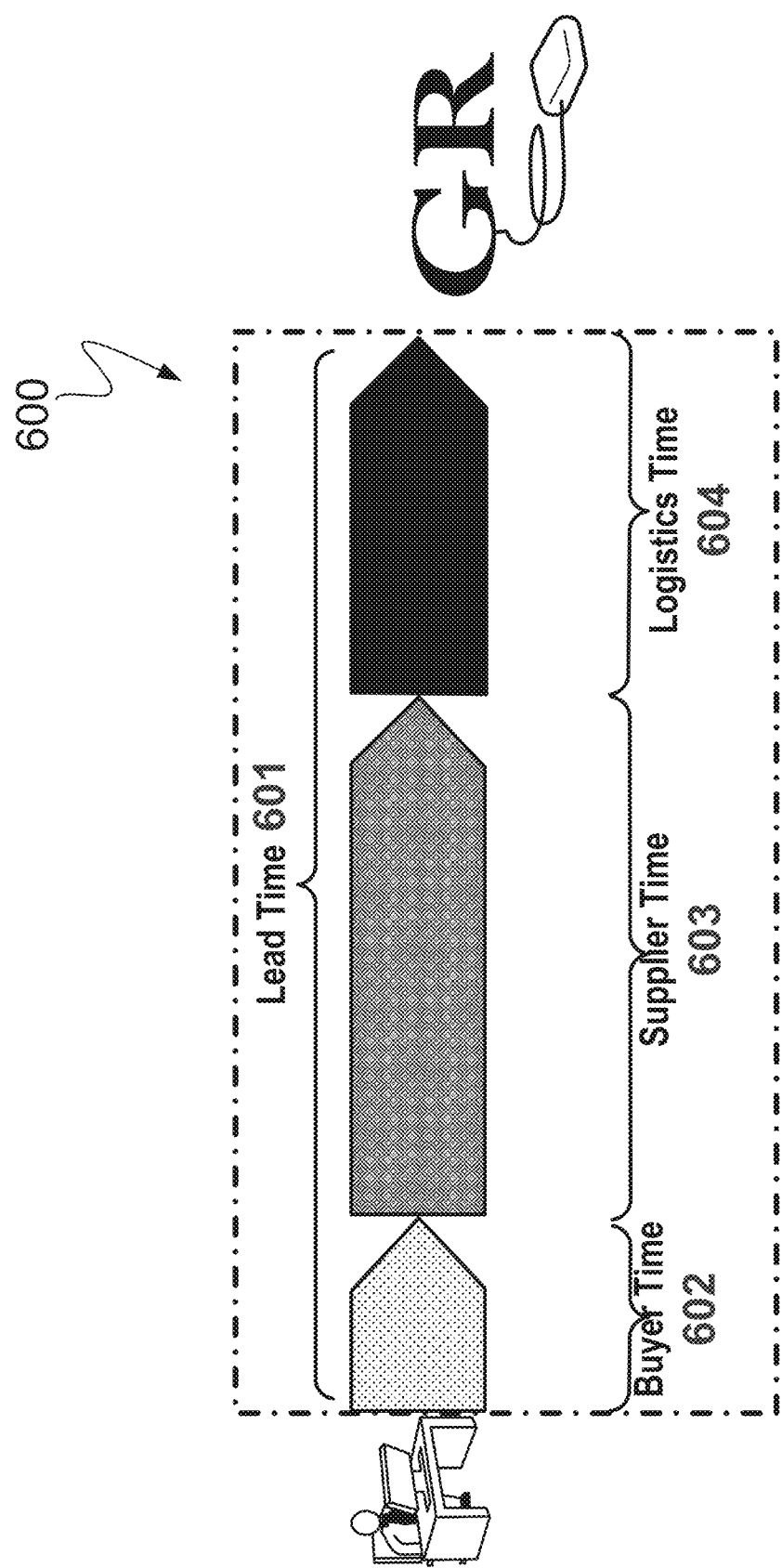
FIG. 6A illustrate an example of a diagram of a lead time according to an implementation of the present disclosure.

For optimal stocking of the materials in the identified material hub, lead time for each material needs to be accurately calculated to avoid inaccuracies in master date of planned delivery time, purchasing records and contracts. Referring to diagram 600 in FIG. 6A, lead time 601 can generally include buyer time 602, supplier time 603, and logistics time 604. This lead time 601 thus characterizes the time period from a buyer places a purchase order (e.g., from buyer's desktop) to the time of goods received (GR). Here, once a purchase requisition is released to the buyer, buyer time 602 starts. Proper estimation for these parameters reduces unrealistic replenishment time which reduces scheduling overhead in material procurement and production. This is executed automatically, at regular interval, to avoid excessive manual review and verification. The regular interval ensures that trends from recent records are accounted for in the new values.

Figure 6B:
FIG. 6B illustrates an example of a calculation output of the lead time according to an implementation of the present disclosure.

Some implementations may follow the following steps to compute the lead time for each material. First, actual procurement time is obtained so that time reference is defined specifically for each material in question. Second, outliers are identified and removed so that the statistical outliers of procurement time for each item in question are excluded. Third, the mean value of procurement time can be computed as the lead time for each item. In these implementations, the lead time for every material can be calculated based on the historic purchase orders and their actual delivery dates. FIG. 6B illustrates an output 620 of this calculation in a simulated test run. Indeed, the calculation can be performed at the level of each CP plant. FIG. 6C further illustrates a screenshot 630 showing the basis of calculation of lead time which includes procurement document such as purchase requisition, purchase order, goods receipts documents and their dates. The lead time may then be derived by calculating the mean average after eliminating the outlier (e.g., using an outlier range factor of 1.5). The outlier factor can be part of a configurable business rule. Some implementations may include the functionalities of: lead time based on actual goods receipts, accurate values for each material, identification and elimination of outliers, automation, simulation capability, notifications and reporting.

Figure 7:
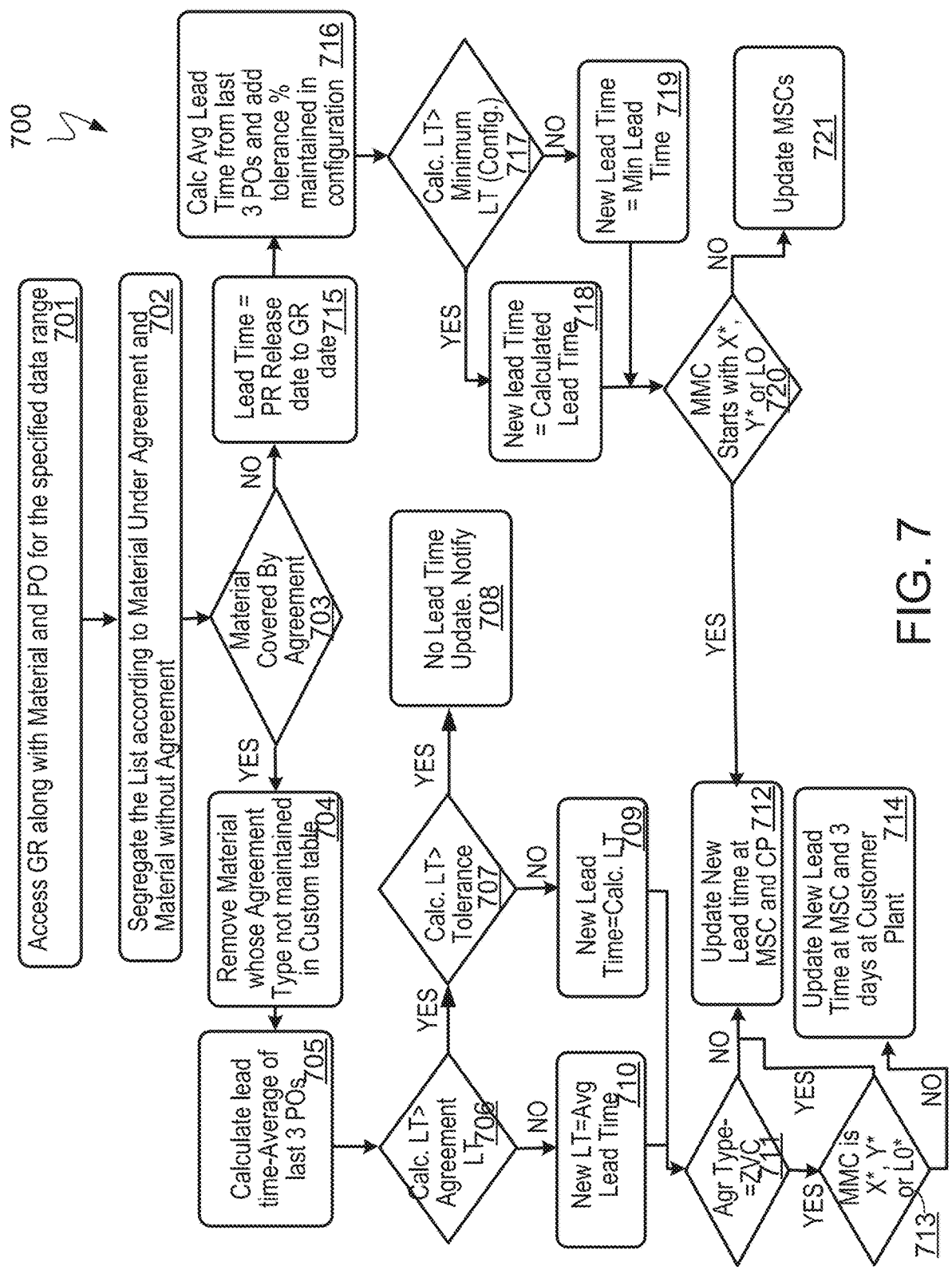
FIG. 7 shows an example of a flowchart of a calculation process.

Referring to FIG. 7, flowchart 700 represents an example of a calculation process. The calculation process may initially access data encoding goods receipts along with the material and purchase order for the specified date range (701). The calculation process may then segregate the list according to material under agreement and material without agreement (702). A determination is made as to whether the material is covered by an agreement, for example, a purchase agreement (703). With the purchase agreement in place, the lead time is agreed upon with the vendor.

If this material is covered by an agreement, the calculation process may remove the material whose agreement type is not maintained in the customer table (704). The calculating process may then calculate lead time as the average of, for example, the last three purchase orders (705). The calculation process then determines whether the calculated lead time is greater than a lead time under the agreement (706). If the calculated lead time is greater than the lead time under the agreement, then another determination is made as to whether the calculated lead time is greater than a tolerance level (707). If the calculated lead time is greater than the tolerance, then no lead time update is performed and a controller may be notified (708). If the calculated lead time is not greater than the tolerance, then the new lead time can be updated as the calculated lead time (709). Subsequent to determining that the calculated lead time is not greater than the lead time under the agreement (706), the calculation process may update the new lead time as the agreed lead time (710). Subsequent to updating the new lead time in blocks 710 and 709, the calculation process may proceed to determine whether the agreed type is of a certain type, (e.g., ZVC) (711). Here, ZVC refers to value agreement. If the agreed type is not the particular type, then the calculating process may update new lead time at the MSC center and the CP plant (712). If the agreed type is the desired type, the MMC code is inspected to verify if the MMC code is one of a X type, a Y type, or a L0 type (713) before proceeding to update the new lead time at the MSC center and the CP plant (712). If the MMC code is not one of a X type, Y type, or L0 type, then the calculating process proceeds to update the new lead time at the MSC center and may set lead time to be three days at CP plant (714).

If the material is not covered by agreement (703), then the calculation process may proceed to update the lead time as the period from the purchase requisition (PR) release date to the goods receipt (GR) date (715). The calculating process may then proceed to calculate average lead time from, for example, the last three purchase orders (POs) and add a tolerance percentage to be maintained in configuration file (716). A PO may require a new quotation with each registered vendor to be placed with lowest price vendor while an agreement is a preset purchase agreement with a specific vendor leading to auto place of PO without further development. In some cases, the allowed agreements types can include a configured table which user can edit by adding/removing entries. Specifically, the calculation process may proceed to determine whether the calculated lead time is greater than a minimum lead time in the configuration file (717). If so, the calculation process may proceed to update the new lead time as the calculated lead time (718) and then check if the MMC code is one of a pre-determined set of types (e.g., leading with X, Y, or L0) (720). If so, the calculation process may proceed to update the new lead time at a MSC center or a CP plant (712). If not, the calculation process may proceed to update the MSC center (721). If the calculated lead time is not greater than a minimum lead time in the configuration file (717), then the calculation process may proceed to update the new lead time as the minimum lead time (719) before checking if the MMC code is one of a pre-determined set of types (e.g., leading with X, Y, or L0) (720).

While determining the lead time for the material, an estimate of optimal stock levels for that material may be performed. The goal of this estimate is to dynamically find the desired safety stock levels in each hub automatically in a manner that reduces costs while maintaining the desired service levels. In various implementations, the calculation is based on the actual consumption values rather than manually maintained values. Furthermore, implementations allow for simulation based on changes of the input parameters to enable planners to study the impact of changes in the environment such as increasing/decreasing demand, shorter lead time, etc.

Various implementations may classify material items into three categories and assign appropriate MRP types, namely, On-Demand (ZR), reorder point planning (ZM), and forecast planning (ZF). They On-Demand (ZR) type refers to a procedure in materials planning which may be used for slow moving or rarely ordered materials. The materials that are classified under this category will have No safety stock. Procurement would commence only based on arising demands.

The reorder point planning (ZM) refers to a procedure in materials planning where the expert system compares available warehouse stock with the reorder level. If available stock falls below the reorder level, an order proposal is generated. The reorder level (also known as the reorder point) can be made up of the sum of the safety stock plus the expected average material consumption within the replenishment lead time. Therefore, when determining the reorder level, the expert system may take safety stock, previous consumption values or future requirements and the replenishment lead time into account.

The forecast planning (ZF) type refers to a procedure in consumption-based planning that is based on future requirements predictions calculated using the forecast. This type of planning may be used for fast moving materials. Like reorder point planning, forecast-based planning operates by using historical values and forecast values as future requirements are determined via the integrated forecasting program. However, in contrast to reorder point planning, these values then form the basis of the planning run in forecast-based planning. The forecast, which calculates future requirements using historical data, is carried out at regular intervals.

Various implementations may iterate over material items and compute a safety stock level, a re-orderable point (ROP), and a maximum stocking level. The safety stock level specifies the quantity whose purpose is to satisfy unexpectedly high demand in the coverage period. The risk of shortfalls is reduced by having a stock as a buffer of supply. With manual reorder point planning, a user can enter a value in the material master record as a data point for information. With automatic reorder point planning and forecast-based planning, the expert system determines and adjusts the value automatically for forecasting purposes. In these implementations, safety stock may be enforced as:

$$\text{Safety stock} = R.O.P - 1$$

The re-orderable point (ROP) refers to a quantity that, if the stock falls below this quantity, the system flags the material for requirements planning by creating a planning file entry. The reorder point is used for reorder point planning. With manual reorder point planning, a user can enter the reorder point manually for information. With automatic reorder point planning, the expert system determines the reorder point automatically for forecasting purposes. In some implementations, the ROP is empirically determined using the formula:

$$R.O.P=[U*A]+[U*F*SQRT(A)]$$

This value is calculated based on the Average demand during the Lead time of the material. Here, U=Average demand per issue units. In other words Average demand=Lead time/No of hits*Demand in 36 months. A=Average number of issues during the lead time. F=Service factor based on predefined value against the monthly usage.

Maximum stocking level refers to the quantity of the material in this plant that may not be exceeded. In materials planning, the maximum stock level is used only if replenish to maximum stock level was chosen as the lot-sizing procedure; that is, HB as the lot size key. The Lot Size "HB" is used for replenishing the stock to a certain stocking level. In various implementations, it is used in conjunction with Reorder point (ROP) based planning where a maximum stocking level will be calculated and used for auto replenishing the stock up to the maximum level. The other lot size "EX" is used for ordering lot-for-lot. Both are based upon the Economic Order quantity (EOQ). The maximum stocking level to which the inventory would be built will be calculated based on the following formula:

$$\text{Max.Stock Level}=R.O.P+\text{Rounded}(EOQ)-1$$

R.O.P is the recordable point EOQ is the Economic order quantity and calculated using the following formulae:

$$EOQ=SQRT((2*A*S)/(I*C))$$

Here, A=Annual Demand in Units; S=Ordering Costs. I=Costs of carrying Inventory; C=Unit cost. If EOQ is less than 1, then EOQ may be deemed as 1.

The lot size refers to a key that determines which lot-sizing procedure the system uses within materials planning to calculate the quantity to be procured or produced. For MRP type ZM, the Lot size is determined based on the EOQ value. Here, if the EOQ is equal to 1 then the Lot Size would be "EX" otherwise "HB". For MRP type ZF, the lot size for "ZF" is derived based on the month demand based on a configuration of service level. Here, a service level refers to the percentage specifying what proportion of the requirement is to be covered by the warehouse stock. In various implementations, the expert system uses the service level to calculate the safety stock. The higher the service level, the higher will be the safety stock calculated by the system to compensate for additional consumption or delays in delivery.

After this process is completed, the expert system may propose appropriate stocking level parameters to the planner as shown below in FIGS. 8A-8D in which various updates to the database are illustrated.

Figure 8A:
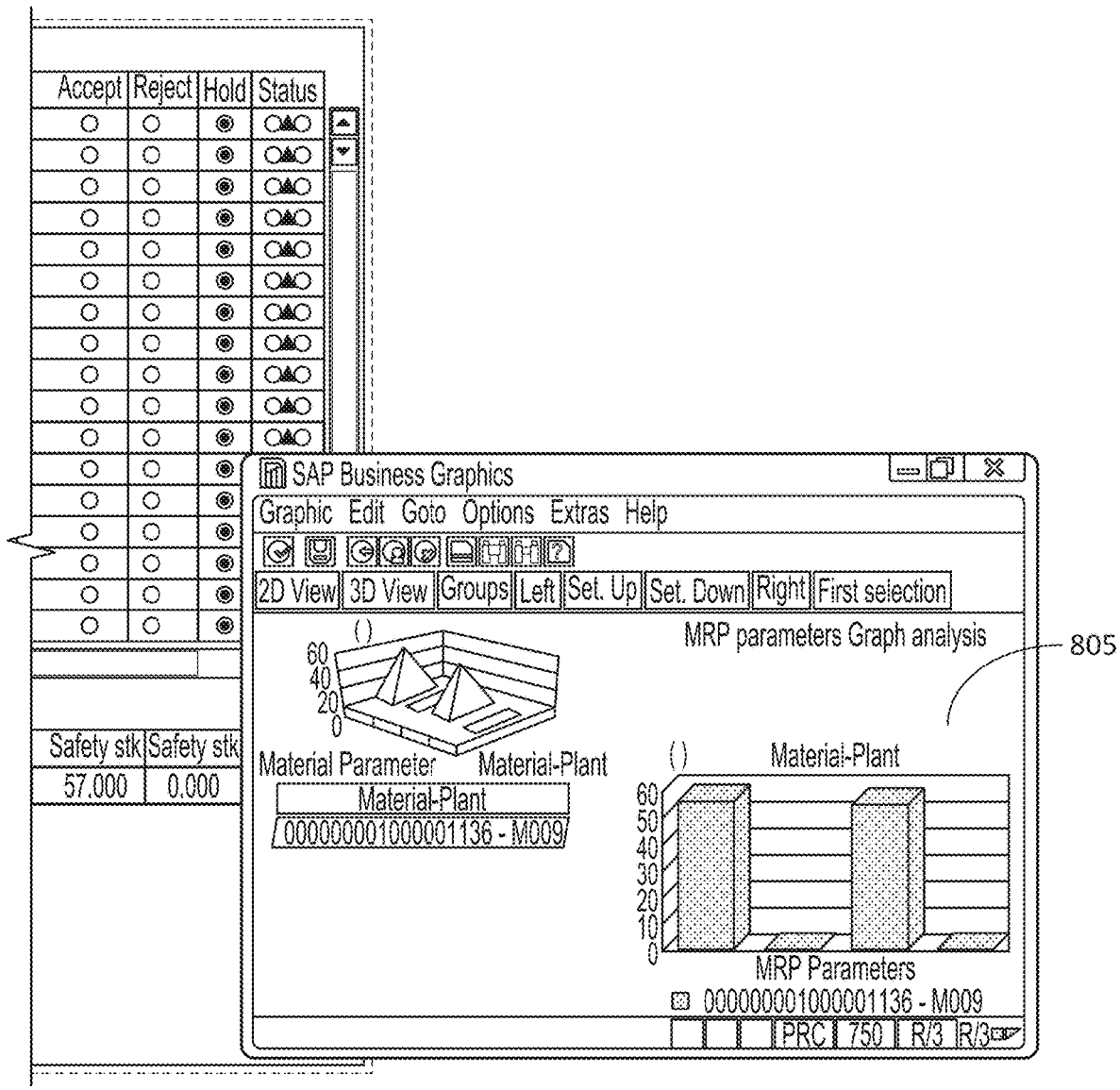

For example, in chart 800 of FIG. 8A, column 801 and column 802 respectively correspond to old and new MRP type, reflecting an update process. Row 803 corresponds to plan M009, whose MRP type progression is shown in row 804 and bar chart 805. Here, the MRP controller queue receives the system calculated values. To the extent that the MRP controller can concur with these calculated values, the feature provides ability to configure the companies stocking policy via configuration.

Figure 8B:
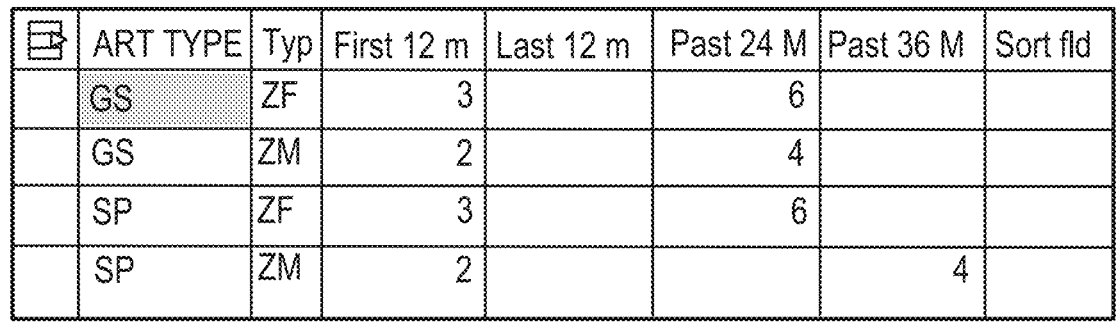

FIG. 8B shows an example of table 820 representing various configurations of MRP parameters according to some implementations. Various implementations seek to tabulate every material's usage, analyze and identify its usage trend, and then update appropriate planning; parameters based on a preset business rule. Table 820 represents an example of a stocking policy to allow the expert system to analyze the usage trend and assign appropriate planning types such as ROP planning or Forecast planning etc. The configuration provides the flexibility to implement each customer to maintain their own stocking policy.

Figure 8C:
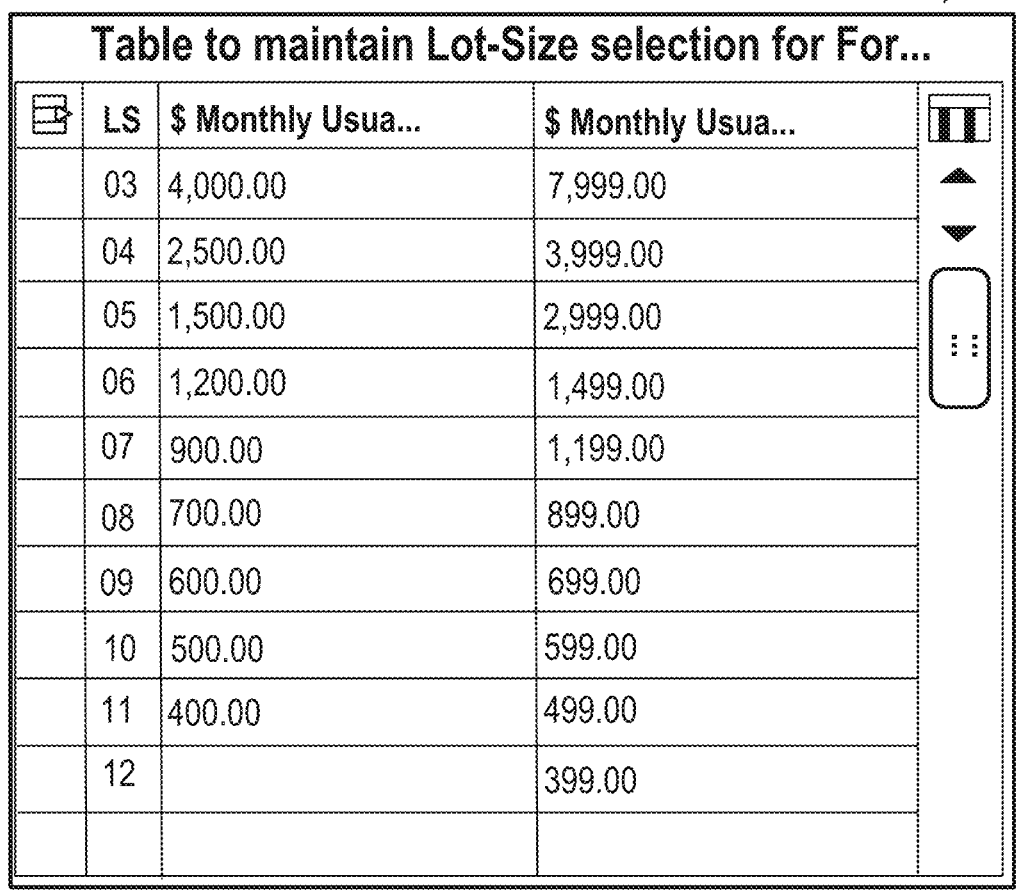

FIG. 8C shows an example of table 830 to maintain lot-size selection for determining lot size configuration according to some implementations. FIG. 8D shows an example of a table 840 to build rules for determining service level according to some implementations.

Figure 9:
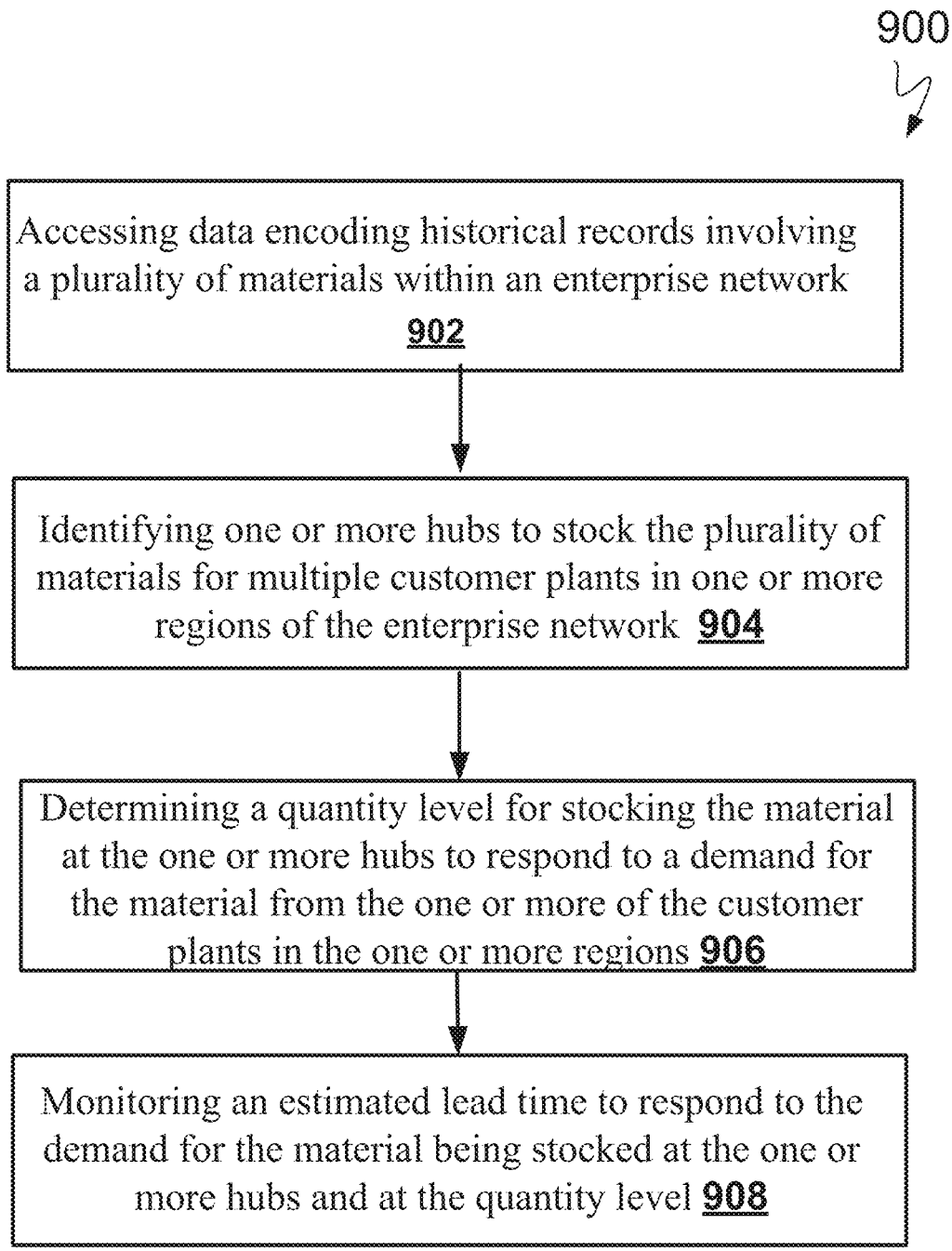
FIG. 9 is an example of a flow chart according to an implementation of the present disclosure.

Referring to FIG. 9, an example of a flow chart 900 is illustrated in accordance with some implementations. The process may access data encoding historical records involving multiple materials within an enterprise network (902). Here, the historical records refer to data records from, for example, an enterprise resource planning (ERP) database. The multitude of materials refer to an inventory supply stocked within the enterprise network to meet internal demands, for example, at internal customer plants. The historical records may indicate a consumption pattern of each material by the various customer plants inside the enterprise network, as well as a delivery pattern of each material when purchased from outside suppliers.

Based on the consumption pattern, the process may identify one or more hubs within the enterprise network to provide supplies of each material for customer plants in one or more regions of the enterprise network (904). In some implementations, if the consumption of the material from a single specific region meets a pre-specified threshold, the material may be marked for single hub planning. On the other hand, if the consumption and demand occur across multiple regions, where no region meets the pre-specified threshold, the material will be considered for multi hub planning. Here, the optimal hub determination may be executed periodically based on the criteria setup for single and multiple hub.

Based on the consumption pattern and the delivery pattern of each material, determining a quantity level for stocking the material at the one or more hubs to respond to a demand for the material from the one or more of the customer plants in the one or more regions (906). Some implementations may determine a safety stock point for the material being stocked at the one or more hubs. Here the safety stock point refers to a desired safety stock level for the material in each hub that is expected to meet demands from internal customer plants before the replenished material can arrive from external requisition. Some implementations may provide a user interface to allow a user to configure a service level that indicates the safety stock point. Here, a higher service level compensates for an additional consumption of the material being stocked by the one or more customer plants or an extension to the estimated lead time.

Some implementations may determine a re-orderable point for the material being stocked at the one or more hubs. For example, the reorder level (also known as the reorder point) is made up of the sum of the safety stock level plus the expected average material consumption within the replenishment lead time. The expert system may compare available warehouse stock with the reorder level. If available stock falls below the reorder level, an order proposal is generated.

Some implementations may determine an upper limit for the material being stocked at the one or more hubs. The upper limit here refers to a quantity of the material in this plant that may not be exceeded. Here, the objective is to avoid an overstock of the material that may induce storage cost that outweigh or offset the benefit of internal storage. Some implementations may also determine an economic order quantity (EOQ) for the material being stocked that characterizes a tradeoff between ordering the material from an outside supply and carrying the material as an internal inventory.

The process may also monitor an estimated lead time to respond to the demand for the material being stocked at the one or more hubs and at the quantity level (908). Some implementations may provide the estimated lead time by obtaining, from the historical records involving the material being stocked, a set of procurement times for the material; identifying statistical outliers in the set of procurement times; removing the statistical outliers from the set of procurement times; and computing a statistical mean of the set of procurement times. Here, providing the estimated lead time may further include: comparing the statistical mean with a threshold that indicates a tolerance level for waiting for a delivery of the material; and in response to the statistical mean being no greater than the threshold, updating the estimated lead time as the statistical mean.

Figure 10:
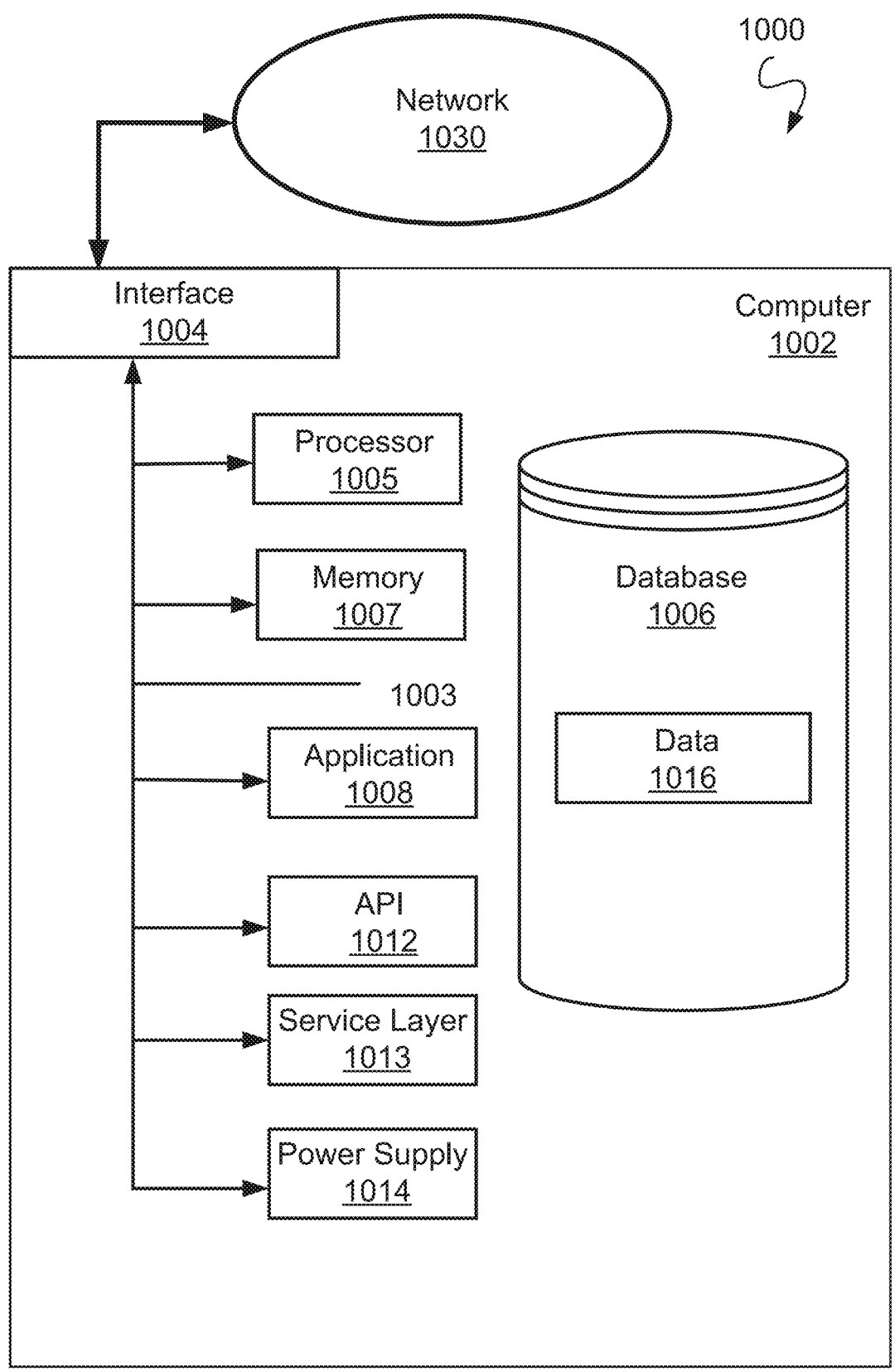
FIG. 10 is a block diagram illustrating an example of a computer system used to provide computational functionalities associated with described algorithms, methods, functions, processes, flows, and procedures, according to an implementation of the present disclosure.

FIG. 10 is a block diagram illustrating an example of a computer system 1000 used to provide computational functionalities associated with described algorithms, methods, functions, processes, flows, and procedures, according to an implementation of the present disclosure. The illustrated computer 1002 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 1002 can comprise a computer that includes an input device, such as a keypad, keyboard, touch screen, another input device, or a combination of input devices that can accept user information, and an output device that conveys information associated with the operation of the computer 1002, including digital data, visual, audio, another type of information, or a combination of types of information, on a graphical-type user interface (UI) (or GUI) or other UI.

The computer 1002 can serve in a role in a computer system as a client, network component, a server, a database or another persistency, another role, or a combination of roles for performing the subject matter described in the present disclosure. The illustrated computer 1002 is communicably coupled with a network 1030. In some implementations, one or more components of the computer 1002 can be configured to operate within an environment, including cloud-computing-based, local, global, another environment, or a combination of environments.

The computer 1002 is an electronic computing device operable to receive, transmit, process, store, or manage data and information associated with the described subject matter. According to some implementations, the computer 1002 can also include or be communicably coupled with a server, including an application server, e-mail server, web server, caching server, streaming data server, another server, or a combination of servers.

The computer 1002 can receive requests over network 1030 (for example, from a client software application executing on another computer 1002) and respond to the received requests by processing the received requests using a software application or a combination of software applications. In addition, requests can also be sent to the computer 1002 from internal users, external or third-parties, or other entities, individuals, systems, or computers.

Each of the components of the computer 1002 can communicate using a system bus 1003. In some implementations, any or all of the components of the computer 1002, including hardware, software, or a combination of hardware and software, can interface over the system bus 1003 using an application programming interface (API) 1012, a service layer 1013, or a combination of the API 1012 and service layer 1013. The API 1012 can include specifications for routines, data structures, and object classes. The API 1012 can be either computer-language independent or dependent and refer to a complete interface, a single function, or even a set of APIs. The service layer 1013 provides software services to the computer 1002 or other components (whether illustrated or not) that are communicably coupled to the computer 1002. The functionality of the computer 1002 can be accessible for all service consumers using this service layer. Software services, such as those provided by the service layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 1002, alternative implementations can illustrate the API 1012 or the service layer 1013 as stand-alone components in relation to other components of the computer 1002 or other components (whether illustrated or not) that are communicably coupled to the computer 1002. Moreover, any or all parts of the API 1012 or the service layer 1013 can be implemented as a child or a sub-module of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002. The interface 1004 is used by the computer 1002 for communicating with another computing system (whether illustrated or not) that is communicatively linked to the network 1030 in a distributed environment. Generally, the interface 1004 is operable to communicate with the network 1030 and comprises logic encoded in software, hardware, or a combination of software and hardware. More specifically, the interface 1004 can comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors can be used according to particular needs, desires, or particular implementations of the computer 1002. Generally, the processor 1005 executes instructions and manipulates data to perform the operations of the computer 1002 and any algorithms, methods, functions, processes, flows, and procedures as described in the present disclosure.

The computer 1002 also includes a database 1006 that can hold data for the computer 1002, another component communicatively linked to the network 1030 (whether illustrated or not), or a combination of the computer 1002 and another component. For example, database 1006 can be an in-memory, conventional, or another type of database storing data consistent with the present disclosure. In some implementations, database 1006 can be a combination of two or more different database types (for example, a hybrid in-memory and conventional database) according to particular needs, desires, or particular implementations of the computer 1002 and the described functionality. Although illustrated as a single database 1006 in FIG. 10, two or more databases of similar or differing types can be used according to particular needs, desires, or particular implementations of the computer 1002 and the described functionality. While database 1006 is illustrated as an integral component of the computer 1002, in alternative implementations, database 1006 can be external to the computer 1002. As illustrated, the database 1006 holds the previously described data 1016 including, for example, multiple streams of data from the enterprise resource planning database, including, for example, historical data records of the consumption pattern of each material by each customer plant within the enterprise network, the delivery pattern of each material from outside suppliers when, for example, purchase orders are placed.

The computer 1002 also includes a memory 1007 that can hold data for the computer 1002, another component or components communicatively linked to the network 1030 (whether illustrated or not), or a combination of the computer 1002 and another component. Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 or similar or differing types can be used according to particular needs, desires, or particular implementations of the computer 1002 and the described functionality. While memory 1007 is illustrated as an integral component of the computer 1002, in alternative implementations, memory 1007 can be external to the computer 1002.

The application 1008 is an algorithmic software engine providing functionality according to particular needs, desires, or particular implementations of the computer 1002, particularly with respect to functionality described in the present disclosure. For example, application 1008 can serve as one or more components, modules, or applications. Further, although illustrated as a single application 1008, the application 1008 can be implemented as multiple applications 1008 on the computer 1002. In addition, although illustrated as integral to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion or management circuits (including recharging, standby, or another power management functionality). In some implementations, the power-supply 1014 can include a power plug to allow the computer 1002 to be plugged into a wall socket or another power source to, for example, power the computer 1002 or recharge a rechargeable battery.

There can be any number of computers 1002 associated with, or external to, a computer system containing computer 1002, each computer 1002 communicating over network 1030. Further, the term "client," "user," or other appropriate terminology can be used interchangeably, as appropriate, without departing from the scope of the present disclosure. Moreover, the present disclosure contemplates that many users can use one computer 1002, or that one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   accessing data encoding historical records involving a plurality of materials within an enterprise network, the historical records indicating a consumption pattern of each material as well as a delivery pattern of each material;
   based on the consumption pattern, identifying one or more hubs to stock the plurality of materials for multiple customer plants in one or more regions of the enterprise network;
   based on the consumption pattern and the delivery pattern of each material, determining a quantity level for stocking each material at the one or more hubs such that a demand for each material from the multiple customer plants in the one or more regions is timely responded within an estimated lead time; and
   based on the delivery pattern of each material, dynamically providing the estimated lead time to respond to the demand for each material being stocked at the one or more hubs and at the quantity level by:
      obtaining, from the historical records involving the material being stocked, a set of procurement times for the material;
      identifying statistical outliers in the set of procurement times;
      removing the statistical outliers from the set of procurement times; and
      computing a statistical mean of the set of procurement times;
      comparing the statistical mean with a threshold that indicates a tolerance level for waiting for a delivery of the material; and
      in response to the statistical mean being no greater than the threshold, updating the estimated lead time as the statistical mean.

2. The computer-implemented method of claim 1, further comprising:
   determining a safety stock point for each material being stocked at the one or more hubs.

3. The computer-implemented method of claim 2, further comprising:
   configuring a service level to indicate the safety stock point, wherein a higher service level compensates for an additional consumption of each material being stocked by the multiple customer plants or an extension to the estimated lead time.

4. The computer-implemented method of claim 1, further comprising:
   determining a re-orderable point for each material being stocked at the one or more hubs.

5. The computer-implemented method of claim 1, further comprising:
   determining an upper limit for each material being stocked at the one or more hubs.

6. The computer-implemented method of claim 1, further comprising:
   determining an economic order quantity (EOQ) for each material being stocked that characterizes a tradeoff between ordering the material from an outside supply and carrying the material as an internal inventory.

7. The computer-implemented method of claim 1, wherein identifying the one or more hubs is performed periodically to refresh the identified one or more hubs.

8. A computer system comprising one or more computer processors configured to perform operations of:
- accessing data encoding historical records involving a plurality of materials within an enterprise network, the historical records indicating a consumption pattern of each material as well as a delivery pattern of each material;
- based on the consumption pattern, identifying one or more hubs to stock the plurality of materials for multiple customer plants in one or more regions of an enterprise network;
- based on the consumption pattern and the delivery pattern of each material, determining a quantity level for stocking each material at the one or more hubs such that a demand for each material from the multiple customer plants in the one or more regions is timely responded within an estimated lead time; and
- based on the delivery pattern of each material, dynamically providing the estimated lead time to respond to the demand for each material being stocked at the one or more hubs and at the quantity level by:
  - obtaining, from the historical records involving the material being stocked, a set of procurement times for the material;
  - identifying statistical outliers in the set of procurement times;
  - removing the statistical outliers from the set of procurement times; and
  - computing a statistical mean of the set of procurement times;
  - comparing the statistical mean with a threshold that indicates a tolerance level for waiting for a delivery of the material; and
  - in response to the statistical mean being no greater than the threshold, updating the estimated lead time as the statistical mean.

9. The computer system of claim 8, wherein the operations further comprise:
- determining a safety stock point for each material being stocked at the one or more hubs.

10. The computer system of claim 9, wherein the operations further comprise:
- configuring a service level to indicate the safety stock point, wherein a higher service level compensates for an additional consumption of each material being stocked by the multiple customer plants or an extension to the estimated lead time.

11. The computer system of claim 8, wherein the operations further comprise:
- determining a re-orderable point for each material being stocked at the one or more hubs.

12. The computer system of claim 8, wherein the operations further comprise:
- determining an upper limit for each material being stocked at the one or more hubs.

13. The computer system of claim 8, wherein the operations further comprise:
- determining an economic order quantity (EOQ) for each material being stocked that characterizes a tradeoff between ordering the material from an outside supply and carrying the material as an internal inventory.

14. The computer system of claim 8, wherein identifying the one or more hubs is performed periodically to refresh the identified one or more hubs.

* * * * *